US012771656B2

(12) United States Patent
Kano et al.

(10) Patent No.: US 12,771,656 B2
(45) Date of Patent: Oct. 20, 2026

(54) SERVER, SWITCHING METHOD, AND SWITCHING PROGRAM

(71) Applicant: NTT, Inc.

(72) Inventors: Hiroki Kano, Tokyo (JP); Shinya Kawano, Tokyo (JP); Katsuma Miyamoto, Tokyo (JP); Koji Sugisono, Tokyo (JP)

(73) Assignee: NTT, Inc., Tokyo (JP)

( * ) Notice: Subject to any disclaimer, the term of this patent is extended or adjusted under 35 U.S.C. 154(b) by 33 days.

(21) Appl. No.: 18/841,371

(22) PCT Filed: Feb. 28, 2022

(86) PCT No.: PCT/JP2022/008308
§ 371 (c)(1),
(2) Date: Aug. 24, 2024

(87) PCT Pub. No.: WO2023/162228
PCT Pub. Date: Aug. 31, 2023

(65) Prior Publication Data
US 2025/0175440 A1 May 29, 2025

(51) Int. Cl.
*H04L 49/00* (2022.01)
*H04L 49/55* (2022.01)

(52) U.S. Cl.
CPC .............. *H04L 49/70* (2013.01); *H04L 49/55* (2013.01)

(58) Field of Classification Search
None
See application file for complete search history.

(56) References Cited

U.S. PATENT DOCUMENTS

2008/0101230 A1* 5/2008 Liu ........................ H04L 47/125 370/252
2008/0285472 A1* 11/2008 Abdulla .............. G06F 11/2005 370/250
2019/0081891 A1* 3/2019 Mundkur ................ H04L 47/39
2019/0190982 A1* 6/2019 Pope ...................... G06F 9/5044
2023/0269227 A1* 8/2023 Bansal ................ H04L 63/0263 726/1

OTHER PUBLICATIONS

Intel Corporation "Intel FPGA PAC N3000 (Intel FPGA Programmable Acceleration Card N3000)" literature [on-line]. Accessed on Jun. 6, 2024, website: https://web.archive.org/web/20220727080745/https://www.intel.co.jp/content/www/jp/ja/products/details/fpga/platforms/pac/n3000.html.

* cited by examiner

*Primary Examiner* — Mohamed Ibrahim

(57) ABSTRACT

A server (10) includes an FPGA-equipped NIC (11) that is connected to a 0-system vGW (**15*a*) and is equipped with an FPGA (111) which processes a packet, an NIC (12) connected to a 1-system vGW (15*b*), and a switching unit (132). The switching unit (132) switches the NIC that accepts a packet to the NIC (12) by turning off a power supply of the FPGA-equipped NIC (11) when a time period is reached in which power efficiency is better when the vGW (15*b*) processes the packet than when the packet is processed by the FPGA (111), on the basis of a timetable. In addition, the switching unit (132) switches the NIC that accepts the packet to the FPGA-equipped NIC (11) by turning on the power supply of the FPGA-equipped NIC (11) when a time period is reached when the power efficiency is better when the packet is processed by the FPGA (111) than when the packet is processed by the vGW (15*b***).

10 Claims, 9 Drawing Sheets

SERVER, SWITCHING METHOD, AND SWITCHING PROGRAM

CROSS-REFERENCE TO RELATED APPLICATIONS

This application is a U.S. 371 Application of International Patent Application No. PCT/JP2022/008308, filed on 28 Feb. 2022, the disclosure of which is hereby incorporated herein by reference in its entirety.

TECHNICAL FIELD

The present invention relates to a server, a switching method, and a switching program.

BACKGROUND ART

In the related art, there is a technology (network function virtualization (NFV)) that implements a function of a network device as a virtual machine (VM) on a virtualization infrastructure of a general-purpose server. Since the NFV technology can aggregate physical devices, equipment costs can be reduced.

In the NFV technology, a server operates a VM by using a CPU and processes a packet of a network, but processing performance of the CPU is limited. Therefore, increase in traffic amount results in a plurality of servers having to be provided, thus, increasing equipment costs and power consumption.

In order to solve the above-described problem, a technology has been proposed in which a network interface card (NIC) equipped with a field programmable gate array (FPGA) is connected to a server, and packet processing executed by a CPU is offloaded on the hardware (FPGA).

CITATION LIST

Non Patent Literature

Non Patent Literature 1: Intel Corporation FPGA PAC N3000 (Intel FPGA Programmable Acceleration Card N3000), [online], [retrieved on Feb. 15, 2022], Internet <URL: https://www.intel.co.jp/content/www/jp/ja/products/details/fpga/platforms/pac/n3000.html>

SUMMARY OF INVENTION

Technical Problem

Since power consumption of the above-described FPGA is constant regardless of a magnitude of a processing load, the FPGA has a problem in that the power efficiency of a server is poor in a situation where the processing load is low. For example, as illustrated in FIG. 1, in a case where a traffic amount to be processed by a server is small, a problem arises in that power consumption becomes larger when the packet is processed by the FPGA than when the packet is processed by the CPU.

Here, for example, as illustrated in FIG. 2, in a case where the traffic amount to be processed by the server significantly fluctuates with time, a problem arises in that power efficiency is not good when the server processes the packet by the FPGA in both of a time period in which the traffic amount is large (a time period represented by reference numeral 201) and a time period in which the traffic amount is small (a time period represented by reference numeral 202).

In this respect, an object of the present invention is to enhance power efficiency while maintaining processing performance when a server is under a high load.

Solution to Problem

In order to solve the above-described problem, the present invention includes: a first network interface card (NIC) that is connected to a virtual machine and is equipped with a field programmable gate array (FPGA) which processes an input packet destined for the virtual machine; a second NIC to which the same IP address as an IP address of the virtual machine is set and which is connected to a virtual machine that processes an input packet; and a switching unit that switches an NIC that accepts the packet to the second NIC by turning off a power supply of the first NIC when a predetermined time period is reached in which power efficiency is better when the virtual machine processes the packet than when the FPGA processes the packet.

Advantageous Effects of Invention

According to the present invention, it is possible to enhance power efficiency while maintaining processing performance when a server is under a high load.

DESCRIPTION OF EMBODIMENTS

Hereinafter, modes for carrying out the present invention (embodiments) will be described with reference to the drawings. The present invention is not limited to the present embodiments.

Figure 1:
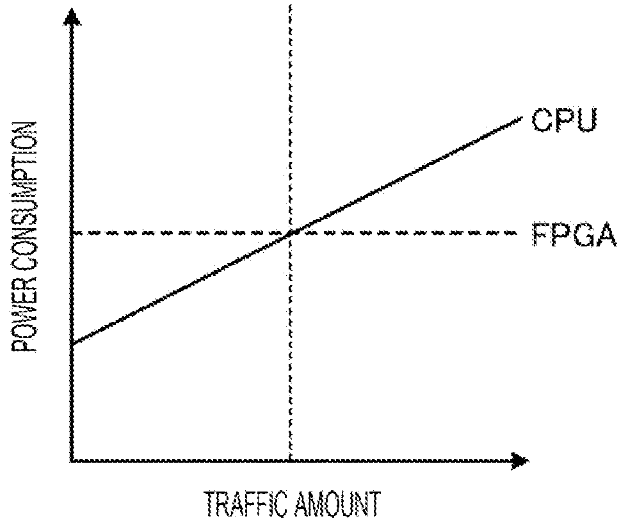
FIG. 1 is a graph illustrating an example of power consumption of a CPU and an FPGA with respect to a traffic amount.
Figure 2:
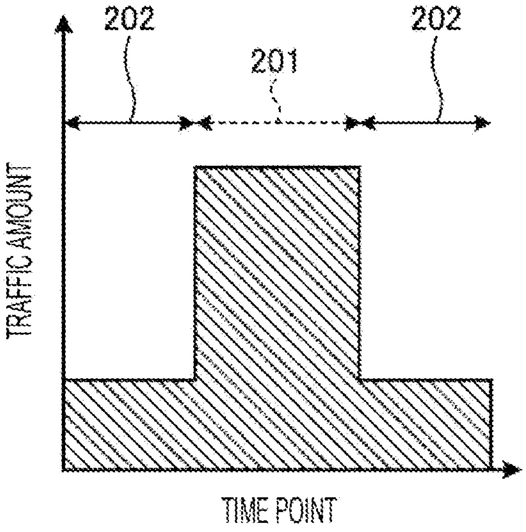
FIG. 2 is a graph illustrating an example of a change in traffic amount for each time point.
Figure 3:
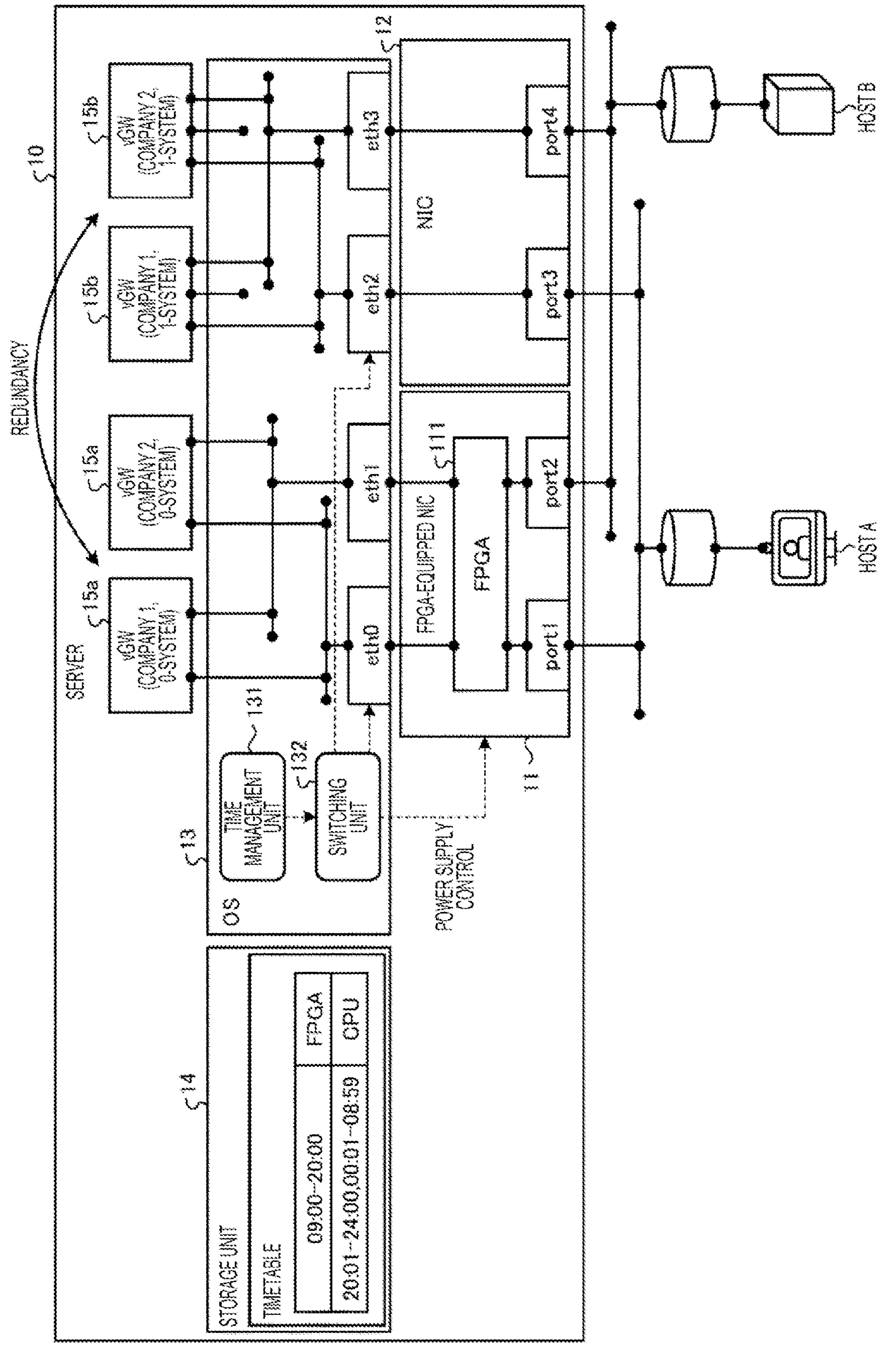
FIG. 3 is a diagram illustrating a configuration example of a server.
Figure 4:
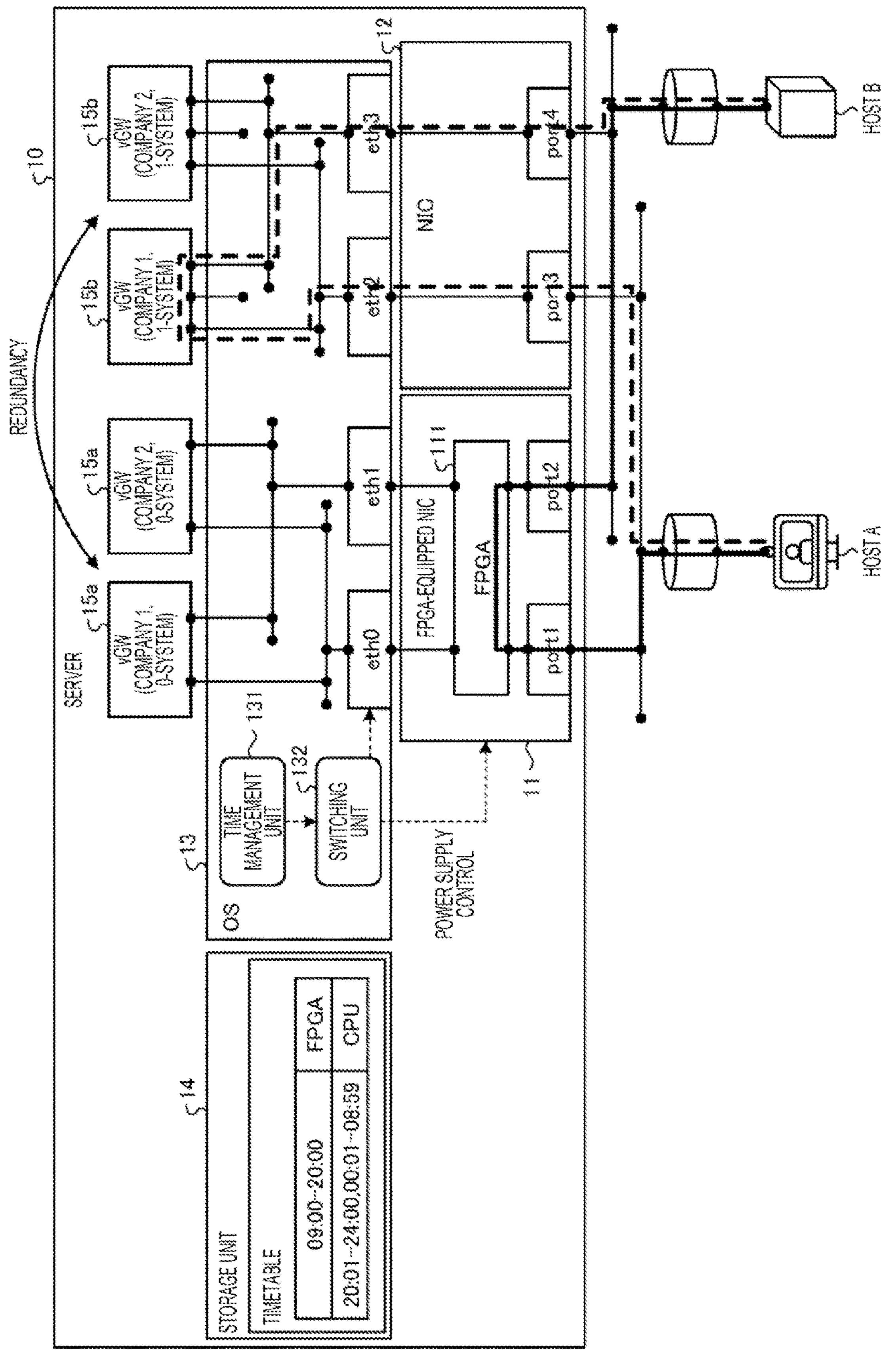
FIG. 4 is a diagram illustrating an example of a path of user traffic in a case where a server processes a packet by an FPGA.

First, an outline of a server 10 of the present embodiment will be described with reference to FIGS. 3 to 5. As illustrated in FIG. 3, the server 10 includes a network interface card (NIC) (first NIC, FPGA-equipped NIC) 11 that is equipped with an FPGA 111 and a normal NIC (second NIC) 12.

A virtual machine (for example, vGW (virtual gateway) 15) having a redundancy configuration is connected to the FPGA-equipped NIC 11 and the NIC 12. Here, among vGWs 15 having the redundancy configuration, a 0-system vGW 15 is referred to as a vGW 15*a*, and a 1-system vGW 15 is referred to as a vGW 15*b*. For example, in a case where the 0-system vGW 15*a* of Company 1 becomes unable to communicate, the 1-system vGW 15*b* of Company 1 is operated instead of the vGW 15*a* and processes an input packet. For example, the 0-system vGW 15*a* is connected to the FPGA-equipped NIC 11, and the 1-system vGW 15*b* is connected to the NIC 12.

A time management unit 131 manages, based on a timetable of a storage unit 14, whether a time period is a time period in which the server 10 should process the packet by the FPGA 111 or a time period in which the packet should be processed by the CPU (vGW 15*b*). In this timetable, as illustrated in FIG. 3, the time period in which the server 10 should process the packet by the FPGA 111 and the time period in which the CPU should process the packet are set. Note that the time period in which the packet should be processed by the FPGA 111 is, for example, a time period in which a traffic amount is relatively large and power efficiency is better when the server 10 processes the packet by the FPGA 111. In addition, the time period in which the CPU should process the packet is, for example, a time period in which a traffic amount is relatively small and power efficiency is better when the server 10 processes the packet by the CPU.

Accordingly, the time management unit 131 issues, on the basis of the above-described timetable, an instruction indicating that the packet should be processed by the FPGA 111, to the switching unit 132, when the time period in which the packet should be processed by the FPGA 111 is reached. In addition, the time management unit 131 issues, on the basis of the timetable, an instruction indicating that the packet should be processed by the CPU, to the switching unit 132, when the time period in which the packet should be processed by the CPU is reached.

The switching unit 132 executes switching of the NIC on the basis of the instruction from the time management unit 131. For example, when the switching unit 132 receives, from the time management unit 131, an instruction indicating that the packet should be processed by the FPGA-equipped NIC 11, a power supply of the FPGA-equipped NIC 11 is turned on. Consequently, since a vGW 15 corresponding to a VIP (virtual IP address) becomes the vGW 15*a*, a packet destined for the VIP is input to the FPGA-equipped NIC 11 and processed by the FPGA 111 (see a path represented by the solid line in FIG. 4).

Figure 5:
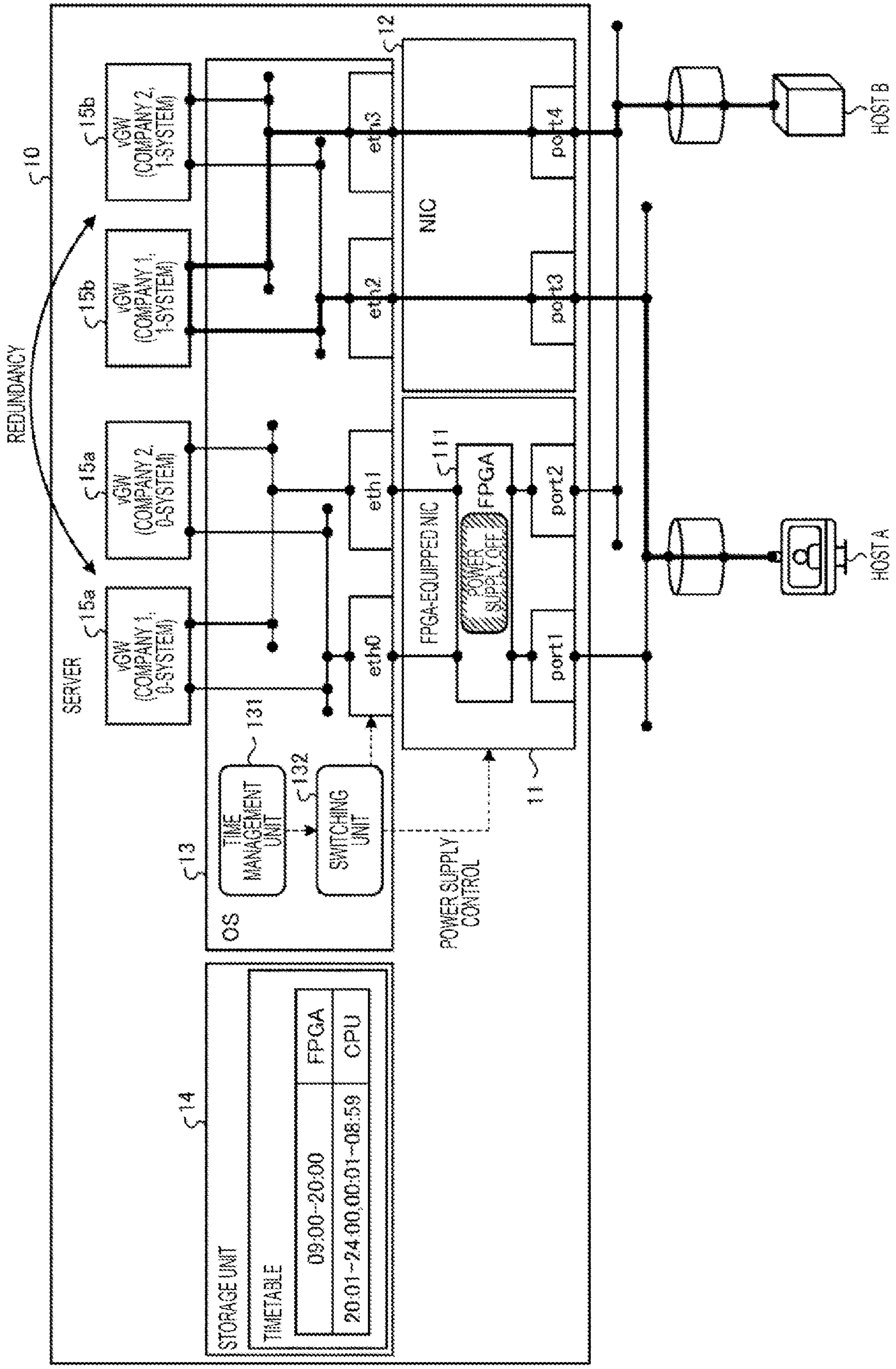
FIG. 5 is a diagram illustrating an example of a path of user traffic in a case where a server processes a packet by a CPU.

On the other hand, when the switching unit 132 receives, from the time management unit 131, an instruction indicating that the packet should be processed by the CPU, the power supply of the FPGA-equipped NIC 11 is turned off (see FIG. 5). Consequently, since the vGW 15 corresponding to the VIP becomes the vGW 15*b*, the packet destined for the VIP is input to the NIC 12 and processed by the vGW 15*b* (see a path represented by the thick line in FIG. 5). That is, the packet is processed by the CPU of the server 10. In addition, when the power supply of the FPGA-equipped NIC 11 is turned off, the power consumption of the server 10 is reduced.

As described above, the server 10 processes the packet by the FPGA 111 in a time period in which power efficiency is better when the packet is processed by the FPGA 111 (for example, a time period in which the traffic amount is large), and the server processes the packet by the CPU in a time period in which the power efficiency is better when the packet is processed by the CPU (for example, a time period in which the traffic amount is small). As a result, it is possible to enhance power efficiency of the server 10 while maintaining processing performance when the server 10 is under a high load.

Configuration Example

Returning to FIG. 3, a configuration example of the server 10 will be described. The server 10 includes the FPGA-equipped NIC 11, the normal NIC 12, an OS 13, the time management unit 131, the switching unit 132, a storage unit 14, and redundant vGWs 15 (vGWs 15*a* and 15*b*).

The FPGA-equipped NIC 11 is an NIC equipped with the FPGA 111 that processes an input packet. The FPGA-equipped NIC 11 includes ports (for example, port1 and port2) that are charge in input and output of a packet. For example, when the FPGA-equipped NIC 11 accepts an input of a packet from port1, the FPGA 111 processes the packet and outputs the processed packet from port2. Of the redundant vGWs 15, the 0-system vGW 15*a* is connected to the FPGA-equipped NIC 11.

The NIC 12 is a normal NIC, and the 1-system vGW 15*b* of the redundant vGWs 15 is connected to the NIC 12. The NIC 12 includes ports (for example, port3 and port4) that are charge in input and output of a packet. For example, a packet accepted by the NIC 12 from port3 reaches the vGW 15*b* via an IF (for example, eth2) of the OS 13. Accordingly, the packet processed by the vGW 15*b* is output from port4 of the NIC 12 via an IF (for example, eth3) of the OS 13.

The OS 13 is basic software that operates the server 10. The OS 13 provides, for example, IFs (eth0 and eth1) that connect the FPGA-equipped NIC 11 and the vGW 15*a*, and IFs (eth2 and eth3) that connect the NIC 12 and the vGW 15*b*.

The time management unit 131 issues, to the switching unit 132, an instruction indicating that which of the FPGA 111 and the CPU should process a packet, on the basis of the timetable of the storage unit 14.

The switching unit 132 executes switching of the NIC on the basis of the instruction from the time management unit 131. For example, when the switching unit 132 receives, from the time management unit 131, an instruction indicating that the packet should be processed by FPGA 111, the power supply of the FPGA-equipped NIC 11 is turned on. On the other hand, when the switching unit 132 receives, from the time management unit 131, an instruction indicating that the packet should be processed by the CPU, the power supply of the FPGA-equipped NIC 11 is turned off (see FIG. 5).

Note that the time management unit 131 and the switching unit 132 may be implemented by hardware or may be implemented by a program execution process.

The storage unit 14 stores data that is to be referred to when the server 10 executes various processes. For example, the storage unit 14 stores a timetable that is to be referred to by the time management unit 131. In the timetable, for example, as illustrated in FIG. 3, a time period in which the server 10 executes packet processing by the FPGA 111 and a time period in which the server 10 executes the packet processing by the CPU are set.

The time period set in the timetable in which the packet processing is executed by the FPGA 111 is a time period in which the power consumption is smaller when the packet processing is executed by the FPGA 111 than when the packet processing is executed by the CPU. The time period is, for example, a time period in which the traffic amount input to the server 10 is larger than a predetermined value, such as 9:00 to 20:00.

In addition, the time period set in the timetable in which the packet processing is executed by the CPU is a time period in which the power consumption is smaller when the packet processing is executed by the CPU than when the packet processing is executed by the FPGA-equipped NIC 11. The time period is, for example, a time period in which the traffic amount input to the server 10 is equal to or smaller than the predetermined value, such as a time period other than 9:00 to 20:00.

The time period in which the packet processing is executed by FPGA 111 and the time period in which the packet processing is executed by the CPU which are set in the timetable are determined by, for example, a measurement result of an input traffic amount to the server 10 for each time period. In addition, the time period set in the timetable can be appropriately changed by an administrator or the like.

The vGW 15 is a virtualized gateway and processes a packet input via the NIC. The vGW 15 has a redundancy configuration. For example, as illustrated in FIG. 3, in a case where the server 10 prepares the vGWs 15 for each of networks of Company 1 and Company 2, the 0-system vGW 15*a* and the 1-system vGW 15*b* are prepared for each of Company 1 and Company 2.

The 0-system vGW 15*a* is the vGW 15 that operates in a normal state. The 1-system vGW 15*b* is a vGW 15 that operates instead of the vGW 15*a* in a case where the vGW 15*a* becomes unable to communicate. The same virtual IP address is set to each of the vGW 15*a* and the vGW 15*b*. The vGW 15*a* and the vGW 15*b* are, for example, virtual routers that become redundancy by a virtual router redundancy protocol (VRRP), and the vGW 15*a* is operated as a master router by the VRRP. Of the vGW 15*a* and the vGW 15*b*, the vGW 15*a* is connected to the FPGA-equipped NIC 11, and the vGW 15*b* is connected to the NIC 12.

[Example of Processing Procedure]

Figure 6:
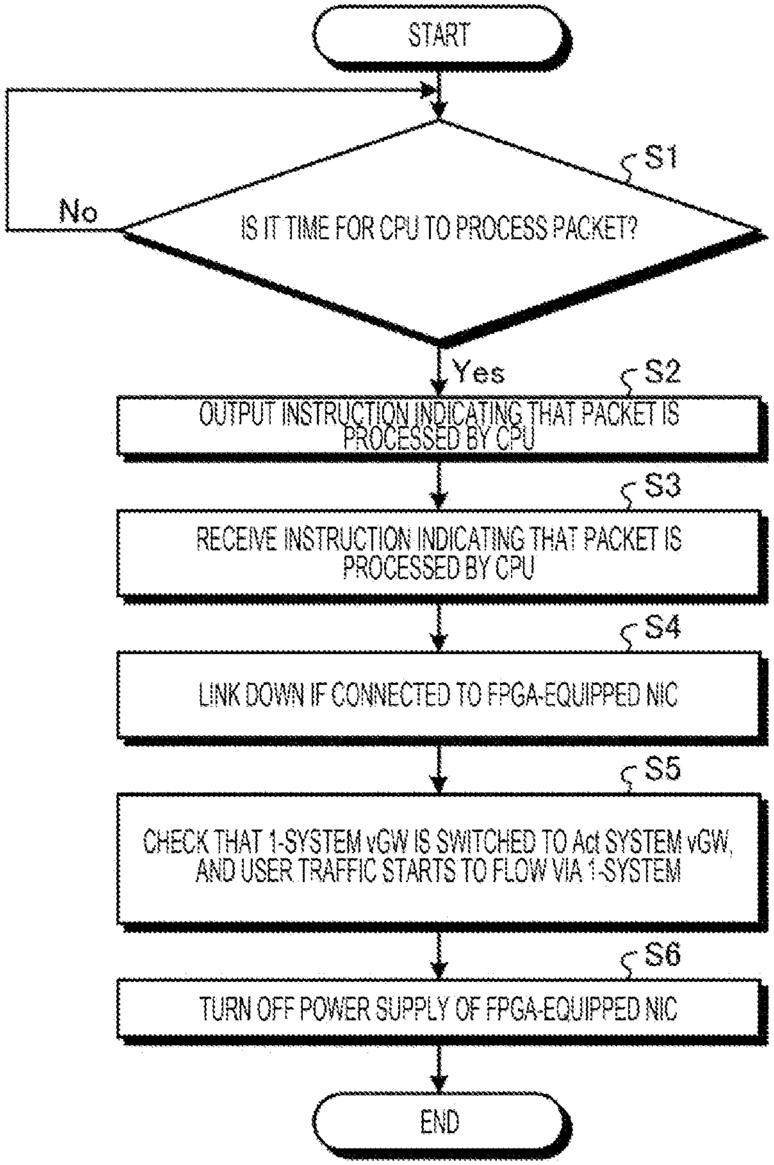
FIG. 6 is a flowchart illustrating an example of a processing procedure in a case where the server performs switching such that packet processing performed by the FPGA is performed by the CPU.

Next, an example of a processing procedure of the server 10 will be described with reference to FIG. 6, as well as FIGS. 4 and 5. First, an example of a processing procedure in a case where the server 10 performs switching such that the packet processing performed by the FPGA 111 is performed by the CPU will be described.

[Switching Method (FPGA→CPU)]

When the time management unit 131 of the server 10 refers to the timetable and detects that the time period in which the CPU processes the packet is reached (Yes in S1), the time management unit 131 outputs, to the switching unit 132, an instruction indicating that the packet is processed by the CPU (S2). On the other hand, in a case where the time period in which the packet processing is executed by the CPU is not reached (No in S1), the processing procedure returns to S1.

After S2, when the switching unit 132 receives the instruction indicating that the packet is processed by the CPU (S3), the switching unit 132 links down the IF (for example, eth0 illustrated in FIG. 4) connected to the FPGA-equipped NIC 11, among the IFs provided by the OS 13 (S4).

After S4, the switching unit 132 checks that the 1-system vGW 15*b* is switched to an ACT-system vGW 15 and the user traffic starts flowing via the 1-system vGW 15*b* (S5). For example, the switching unit 132 checks that the user traffic starts flowing via the vGW 15*b*, on the basis of the traffic amount flowing through the IF (for example, eth2 illustrated in FIG. 4) connected to the vGW 15*b*. Thereafter, the switching unit 132 turns off the power supply of the FPGA-equipped NIC 11 (S6).

Consequently, for example, as illustrated in FIG. 5, the user traffic is input from the NIC 12 of the server 10, reaches the vGW 15*b*, is processed by the vGW 15*b*, and then is output via the NIC 12.

Note that the reason why the switching unit 132 turns off the power supply of the FPGA-equipped NIC 11 after linking down the IF connected to the FPGA-equipped NIC 11 is that the user traffic flows via the FPGA-equipped NIC 11 even in a standby time until the ACT-system vGW 15 is switched from the vGW 15*a* to the vGW 15*b*. Consequently, communication interruption of the user traffic does not occur.

[Switching Method (CPU→FPGA)]

Figure 7:
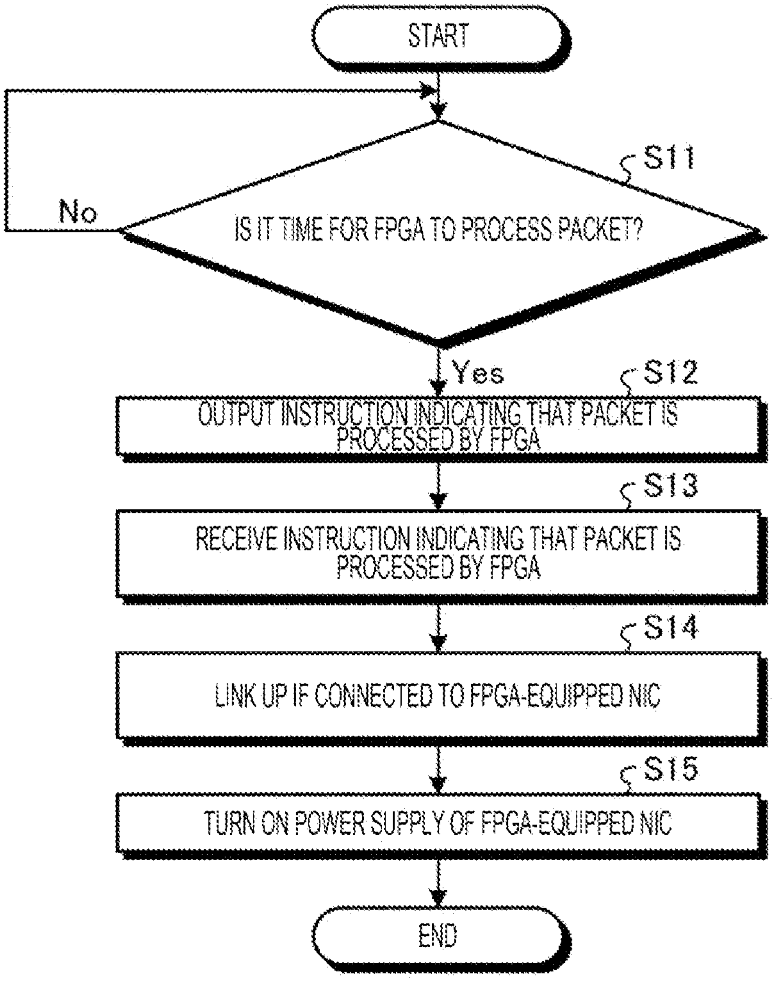
FIG. 7 is a flowchart illustrating an example of a processing procedure in a case where the server performs switching such that the packet processing performed by the CPU is performed by the FPGA.

Next, an example of a processing procedure in a case where the server 10 performs switching such that the packet processing performed by the CPU is performed by the FPGA 111 will be described with reference to FIG. 7, as well as FIG. 4.

When the time management unit 131 of the server 10 refers to the timetable and detects that the time period in which the FPGA 111 processes the packet is reached (Yes in S11), the time management unit 131 outputs, to the switching unit 132, an instruction indicating that the packet is processed by FPGA 111 (S12). On the other hand, in a case where the time period in which the packet processing is executed by the FPGA 111 is not reached (No in S11), the processing procedure returns to S11.

After S12, when the switching unit 132 receives the instruction indicating that the packet is processed by the FPGA 111 (S13), the switching unit 132 links up the IF (for example, eth0 illustrated in FIG. 4) connected to the FPGA-equipped NIC 11, among the IFs provided by the OS 13 (S14), and turns on the power supply of the FPGA-equipped NIC 11 (S15). Consequently, the ACT-system vGW 15 is switched from the 1-system vGW 15*b* to the 0-system vGW 15*a*, and the user traffic starts flowing via the FPGA-equipped NIC 11. Note that the switching unit 132 may link up the IF connected to the FPGA-equipped NIC 11 after turning on the power supply of the FPGA-equipped NIC 11.

[Details of FPGA]

Figure 8:
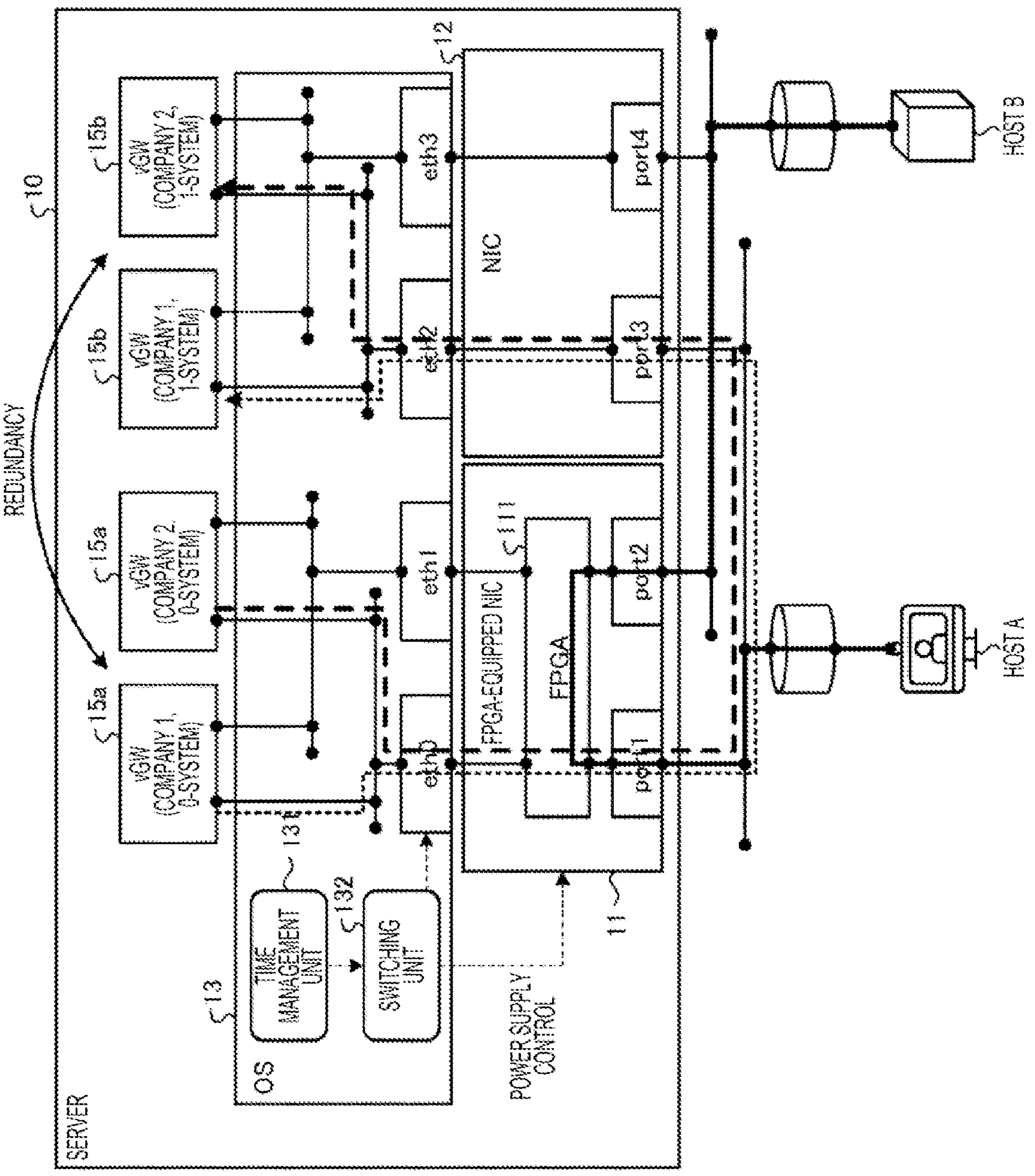
FIG. 8 is a diagram for describing the FPGA of the server.

Next, the FPGA 111 will be described in detail with reference to FIG. 8. Here, a case where, in a time period in which the server 10 executes the packet processing by the FPGA 111, user traffic flows along a path represented by a solid line in FIG. 8, and a power-on/off monitoring packet of the 0-system vGW 15*a* and the 1-system vGW 15*b* flows along a path represented by a broken line in FIG. 8 will be described as an example.

In this case, the FPGA 111 outputs a packet with Dst IP=0-system vGW 15*a* to eth0 of the OS 13. In addition, the FPGA 111 outputs a packet with Dst IP=1-system vGW 15*b* to the opposite port1. Further, in a case where Dst IP is other than the vGWs 15*a* and 15*b*, the FPGA 111 outputs a packet to a port opposite to an input port (for example, port2, in a case where the input port is port1).

In this manner, the FPGA 111 can distinguish the power-on/off monitoring packet between the vGWs 15*a* and 15*b* from the packet of the user traffic and can appropriately perform path control for each packet.

Note that, in the case of the time period in which the server 10 executes the packet processing by the CPU (that is, vGW 15*b*), for example, the user traffic flows through the path illustrated in FIG. 5. In addition, since the FPGA-equipped NIC 11 is powered off in the time period, the power-on/off monitoring packet does not flow between the 0-system vGW 15*a* and the 1-system vGW 15*b*.

According to the server 10 described above, the FPGA-equipped NIC 11 executes the packet processing in the time period in which the power efficiency is better when the FPGA-equipped NIC 11 executes the packet processing (for example, the time period in which the traffic amount is large), and the server executes the packet processing by the CPU in the time period in which the power efficiency is better when the CPU executes the packet processing (for example, the time period in which the traffic amount is small). As a result, the power efficiency of the server 10 can be enhanced.

In the above-described embodiments, the case where the vGWs 15 connected to the FPGA-equipped NIC 11 and the NIC 12 are respectively separate vGWs 15 has been described as an example, but the present invention is not limited thereto. For example, both the FPGA-equipped NIC 11 and the NIC 12 may be connected to the same vGW 15.

[System Configuration and Others]

In addition, each component of each unit illustrated in the drawings is functionally conceptual and does not necessarily have to be physically configured as illustrated in the drawings. That is, specific forms of distribution and integration of devices are not limited to the illustrated forms, and some or all of the devices can be functionally or physically distributed and integrated in any units according to various loads, usage conditions, and the like. Further, all or any part of each processing function performed in each device can be implemented by a CPU and a program executed by the CPU, or can be implemented as hardware by wired logic.

In addition, among the processing described in the above-described embodiment, all or a part of processing described as being automatically performed may be manually performed, or all or a part of processing described as being manually performed may be automatically performed by a known method. Further, the processing procedures, the control procedures, the specific names, and the information including various kinds of data and parameters in the above document and drawings can be arbitrarily changed unless otherwise specified.

[Program]

The time management unit 131 and the switching unit 132 described above can be implemented by installing a program (switching program) as package software or online software in a desired computer. For example, an information processing device is caused to execute the above program, and thereby the information processing device can be caused to function as the time management unit 131 and the switching unit 132. Here, the information processing device also includes mobile communication terminals such as a smartphone, a mobile phone, and a personal handyphone system (PHS) and terminals such as a personal digital assistant (PDA).

Figure 9:
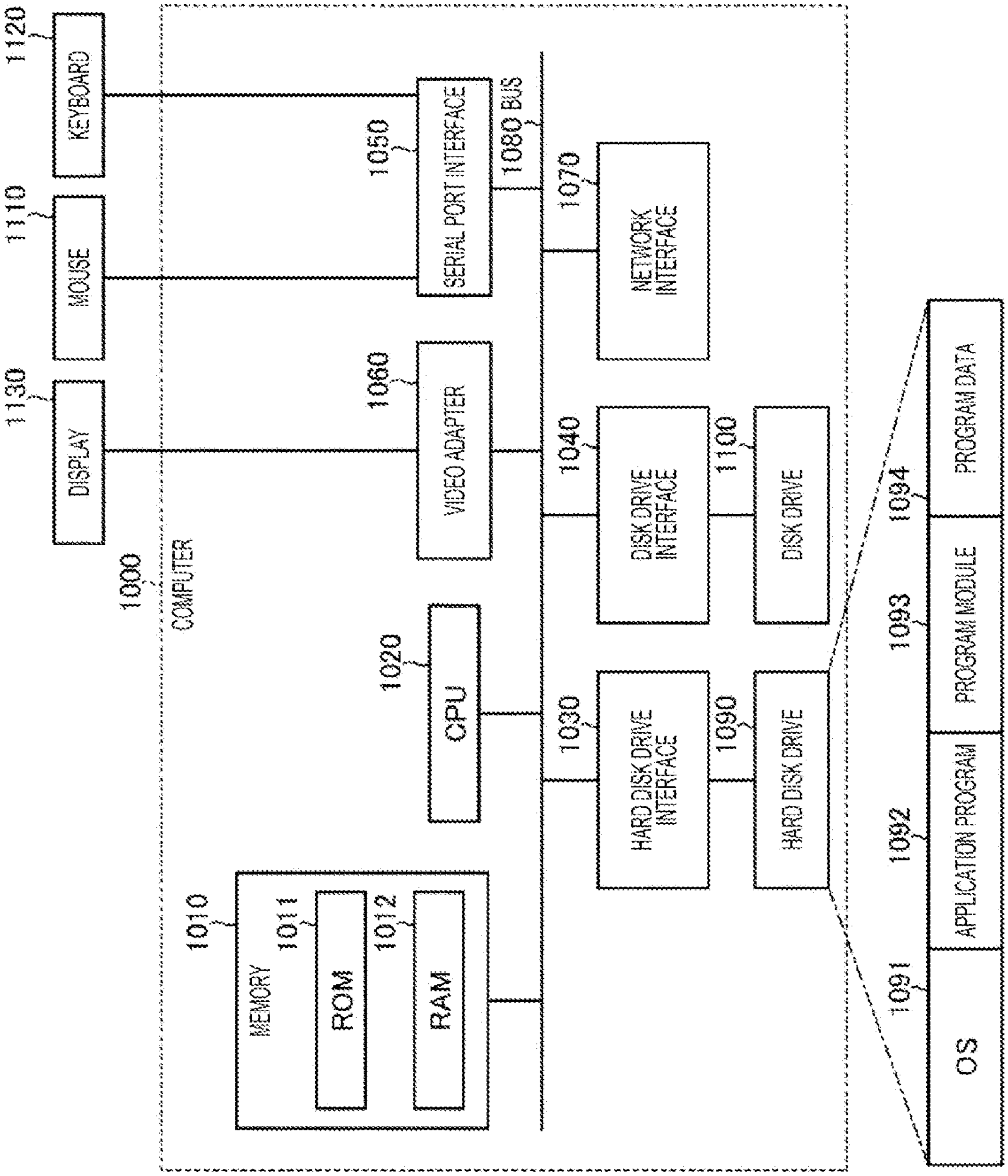
FIG. 9 is a diagram illustrating a configuration example of a computer that executes a switching program.

FIG. 9 is a diagram illustrating an example of a computer that executes the switching program. The computer 1000 includes a memory 1010 and a CPU 1020, for example. The computer 1000 also includes a hard disk drive interface 1030, a disk drive interface 1040, a serial port interface 1050, a video adapter 1060, and a network interface 1070. These units are connected to each other by a bus 1080.

The memory 1010 includes read only memory (ROM) 1011 and random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to a mouse 1110 and a keyboard 1120, for example. The video adapter 1060 is connected to, for example, a display 1130.

The hard disk drive 1090 stores, for example, an OS 1091, an application program 1092, a program module 1093, and program data 1094. That is, a program that defines each piece of processing executed by the time management unit 131 and the switching unit 132 described above is implemented as the program module 1093 in which a code executable by the computer is written. The program module 1093 is stored in, for example, the hard disk drive 1090. For example, the program module 1093 for executing processing similar to the functional configuration in the time management unit 131 and the switching unit 132 is stored in the hard disk drive 1090. Note that the hard disk drive 1090 may be replaced with a solid state drive (SSD).

In addition, data used in the processing of the above-described embodiment is stored, for example, in the memory 1010 or the hard disk drive 1090 as the program data 1094. In addition, the CPU 1020 reads the program module 1093 and the program data 1094 stored in the memory 1010 or the hard disk drive 1090 into the RAM 1012 as necessary and executes the program module 1093 and the program data 1094.

Note that the program module 1093 and the program data 1094 are not limited to being stored in the hard disk drive 1090 and may be stored in, for example, a removable storage medium and be read by the CPU 1020 via the disk drive 1100 or the like. Alternatively, the program module 1093 and the program data 1094 may be stored in another computer connected via a network (local area network (LAN), wide area network (WAN), or the like). In addition, the program module 1093 and the program data 1094 may be read by the CPU 1020 from another computer via the network interface 1070.

REFERENCE SIGNS LIST

10 Server
11 FPGA-equipped NIC (first NIC)
12 NIC (second NIC)
13 OS
14 Storage unit
15(15*a*, 15*b*) vGW
131 Time management unit
132 Switching unit

The invention claimed is:

1. A server comprising:

a first network interface card, wherein the first network interface card (NIC) connects to a first virtual machine associated with an Internet Protocol (IP) address, the first network interface card comprises a field programmable gate array (FPGA), and the field programmable gate array processes an input packet addressed as input to the first virtual machine;

a second network interface card, wherein the second network interface card corresponds to the IP address of the first virtual machine, and the second network interface card connects to a second virtual machine for processing an input packet; and a switch configured to perform switching to the second network interface card to accept the input packet by turning off a power supply of the first network interface card during a predetermined time period, wherein the predetermined time period represents a period when the second virtual machine processing the input packet achieves higher in power efficiency than the field programmable gate array processing the input packet, and the power efficiency of processing the input packet is based on a magnitude of processing load for processing the input packet by a respective network interface card.

2. The server according to claim 1, wherein the switch is further configured to perform switching an NIC that accepts the input packet to the first NIC by turning on the power supply of the first NIC during another predetermined time period when the FPGA processes the input packet at higher in power efficiency than the second virtual machine processing the input packet.

3. The server according to claim 1, wherein the first virtual machine and the second virtual machine represent virtual routers made redundant according to Virtual Router Redundancy Protocol (VRRP), and the first virtual machine represents a master router of the VRRP.

4. The server according to claim 1, wherein the first virtual machine processes the input packet by using the FPGA, and the second virtual machine processes the input packet by using a central processing unit (CPU), and the FPGA achieves higher power efficiency than the CPU when processing load for processing the input packet processed by the FPGA is lower than a predetermined threshold.

5. A switching method executed by a processor in a server, comprising:

a step of switching data traffic from a first network interface card with a first virtual machine that accepts an input packet to a second network interface card with a second virtual machine by turning off a power supply of the first network interface card during a predetermined time period when the second virtual machine processing the input packet achieves higher in power efficiency than a field programmable gate array processing the input packet in the first virtual machine, wherein the server comprises the first network interface card and the second network interface card, the first network interface card connects to the first virtual machine, the first network interface card comprises a field programmable gate array for processing an input packet addressed to the first virtual machine with an IP address, the second network interface card corresponds to the IP address, and the second network interface card connects to the second virtual machine for processing an input packet, and the power efficiency of processing the input packet is based on a magnitude of processing load for processing the input packet by a respective network interface card.

6. The switching method according to claim 5, wherein the step of switching further comprises switching a network interface card that accepts the input packet to the first network interface card by turning on the power supply of the first network interface card during another predetermined time period when the field programmable gate array processes the input packet at higher in power efficiency than the second virtual machine processing the input packet.

7. The switching method according to claim 5, wherein the first virtual machine and the second virtual machine respectively represent virtual routers made redundant according to Virtual Router Redundancy Protocol (VRRP), and the first virtual machine represents a master router of the VRRP.

8. A computer-readable non-transitory recording medium storing a computer-executable switching program instructions that when executed by a processor cause a computer comprising a processor, a step of switching from a first network interface card to a second network interface card to accept an input packet by turning off a power supply of the first network interface card during a predetermined time period, wherein the first network interface card connects to a first virtual machine associated with an IP address, the first network interface card comprises a field programmable gate array, the field programmable gate array processes the input packet addressed as input to the first virtual machine, the second network interface card corresponds to the IP address of the first virtual machine, the second network interface card connects to a second virtual machine for processing the input packet, and the predetermined time period represents a period when the second virtual machine processing the input packet achieves higher in power efficiency than the field programmable gate array processing the input packet, and the power efficiency of processing the input packet is based on a magnitude of processing load for processing the input packet by a respective network interface card.

9. The computer-readable non-transitory recording medium according to claim 8, wherein the step of switching further comprises switching a network interface card that accepts the input packet to the first network interface card by turning on the power supply of the first network interface card during another predetermined time period when the field programmable gate array processes the input packet at higher in power efficiency than the second virtual machine processing the input packet.

10. The computer-readable non-transitory recording medium according to claim 8, wherein the first virtual machine and the second virtual machine respectively represent virtual routers made redundant according to Virtual Router Redundancy Protocol (VRRP), and the first virtual machine represents a master router of the VRRP.

* * * * *